(12) United States Patent
Burckart et al.

(10) Patent No.: US 9,071,516 B2
(45) Date of Patent: *Jun. 30, 2015

(54) SERVER-SIDE PROTOCOL CONFIGURATION OF ACCESSING CLIENTS

(75) Inventors: Erik J. Burckart, Raleigh, NC (US); Stephen M. Fontes, Morrisville, NC (US); Craig A. Lanzen, Lambertville, MI (US)

(73) Assignee: Internatioanl Business Machines Corporation, Armonk, NY (US)

( * ) Notice: Subject to any disclaimer, the term of this patent is extended or adjusted under 35 U.S.C. 154(b) by 1332 days.

This patent is subject to a terminal disclaimer.

(21) Appl. No.: 12/415,034

(22) Filed: Mar. 31, 2009

(65) Prior Publication Data

US 2009/0234961 A1    Sep. 17, 2009

Related U.S. Application Data

(62) Division of application No. 10/789,573, filed on Feb. 27, 2004, now Pat. No. 7,519,718.

(51) Int. Cl.
*G06F 15/167* (2006.01)
*H04L 12/24* (2006.01)
*H04L 29/08* (2006.01)
*H04L 29/06* (2006.01)

(52) U.S. Cl.
CPC .......... *H04L 41/0803* (2013.01); *H04L 67/303* (2013.01); *H04L 67/125* (2013.01); *H04L 67/02* (2013.01); *H04L 69/18* (2013.01); *H04L 69/32* (2013.01); *H04L 69/329* (2013.01)

(58) Field of Classification Search
CPC ............... H04L 41/0803; H04L 69/18

USPC ................. 709/230, 221, 220, 227; 370/217; 710/15

See application file for complete search history.

(56) References Cited

U.S. PATENT DOCUMENTS

| | | | |
|---|---|---|---|
| 5,548,726 A | 8/1996 | Pettus | |
| 5,826,027 A * | 10/1998 | Pedersen et al. | 709/221 |
| 5,951,639 A | 9/1999 | MacInnis | |
| 6,212,160 B1 * | 4/2001 | Barbieri et al. | 370/217 |
| 6,311,278 B1 | 10/2001 | Raanan et al. | |
| 6,349,337 B1 * | 2/2002 | Parsons et al. | 709/227 |
| 6,601,094 B1 * | 7/2003 | Mentze et al. | 709/220 |
| 7,519,718 B2 * | 4/2009 | Burckart et al. | 709/230 |
| 2002/0004834 A1 * | 1/2002 | Guenther et al. | 709/230 |
| 2003/0140129 A1 * | 7/2003 | Livnat et al. | 709/221 |
| 2004/0088448 A1 * | 5/2004 | Joshi et al. | 710/15 |

FOREIGN PATENT DOCUMENTS

| | | |
|---|---|---|
| EP | 1292160 A1 | 3/2003 |
| EP | 1 370 044 A2 | 10/2003 |

(Continued)

*Primary Examiner* — Jungwon Chang
(74) *Attorney, Agent, or Firm* — Steven M. Greenberg, Esq.; CRGO Law (57) ABSTRACT

A method for configuring a client-side communications protocol stack includes a mapping to be consulted to determine a set of client-side protocol stack components which correspond to a set of protocol stack components in a server side protocol stack instance. Subsequently, a listing can be created of the determined set of client-side protocol stack components. Finally, the listing can be published for access by externally disposed client computing processes. The listing can be reversed. Also, the consulting step further can include determining at least one attribute to be applied to at least one of the client-side protocol stack components when enabling a client-side protocol stack to interoperate with the server-side protocol stack instance.

18 Claims, 4 Drawing Sheets

(56) References Cited

FOREIGN PATENT DOCUMENTS

| EP | 1 292 160 A2 | 12/2003 |
| JP | 5046414 A | 2/1993 |
| JP | 8195870 | 7/1996 |
| JP | 11275169 | 10/1999 |
| JP | 2000090030 A | 3/2000 |

* cited by examiner

SERVER-SIDE PROTOCOL CONFIGURATION OF ACCESSING CLIENTS

CROSS-REFERENCE TO RELATED APPLICATIONS

This application is a Divisional of U.S. application Ser. No. 10/789,573, filed Feb. 27, 2004, now U.S. Pat. No. 7,519,718 entitled "SERVER-SIDE PROTOCOL CONFIGURATION OF ACCESSING CLIENTS," which is incorporated herein by reference in its entirety.

BACKGROUND OF THE INVENTION

1. Field of the Invention

The present invention relates to the field of inter-process communications and more particularly to configuring client processes for communication with server processes.

2. Description of the Related Art

Inter-process communications relates to the exchange of information between two or more computing processes, whether the processes are disposed together within a single, computing device, or whether the processes are remotely positioned from one another about a computer communications network. Traditionally, separate computing processes can communicate with one another over communicative links established for the purpose of exchanging information. In most circumstances, information can be exchanged using a common communications protocol negotiated prior to the establishment of, or during the course of establishing a communicative link.

In many cases, the common communications protocol utilized by two or more computing processes to exchange information can be predetermined before any attempt is made to establish a communicative link. For example, in the context of the Internet, Web content can be exchanged between a content server and a content browser using the hypertext transfer protocol (HTTP) over TCP/IP. Still, communicative protocols are not necessarily limited to the physical network layer based exchange of data. Rather, communicative protocols can include any collection of operations and communicative configurations required to permit the exchange of information between two or more computing processes. In this regard, a communicative protocol can include not only the mechanism for transferring data between the processes, but also ancillary settings and operations such as encryption, compression and tunneling protocols, to name a few.

In certain situations, a communications protocol will not have been pre-determined as between a client computing process and a server computing process. In particular, where the server computing process has been configured to communicate with a multiplicity of client computing processes using many different communications protocols, it cannot be pre-determined which computing process to utilize for any one session between client and server. In consequence, oftentimes, client computing processes are left to select a suitable communications protocol through a process of trial and error. Specifically, in the prototypical circumstance, the client process can include a table of multiple possible communications protocols. As such, the client process can attempt to establish a communicative link with the server process using each possible communications protocol until such time as a communicative link has been successfully established.

The foregoing process for establishing a communicative link between server processes can be effective in as much as ultimately, a communicative link can be established using one of the known communications protocols. Still, the skilled artisan will recognize the terrible waste of resources which can occur with each failure to establish a communicative link using a particular communications protocol other than the communications protocol ultimately selected in establishing the communicative link. To the extent possible, it would be preferable to avoid the process of trial and error in selecting a communications protocol to achieve a greater level of performance.

BRIEF SUMMARY OF THE INVENTION

The present invention addresses the deficiencies of the art in respect to inter-process communications and provides a novel and non-obvious method, system and apparatus for configuring a communications protocol stack in a client side computing process. In a preferred aspect of the invention, an inter-process communications protocol configuration system can include a mapping of server-side protocol stack components to client-side protocol stack components in a server-side protocol stack. The system also can include a listing of dependent ones of the server-side protocol stack components in the server-side protocol stack based upon the mapping. Finally, the system can include a publishable interface to the listing.

The mapping can include a set of linkages between protocol stack components of the server-side protocol stack and corresponding protocol stack components required to exist in an associated client-side protocol stack. The mapping also can include a set of attributes for selected ones of the corresponding protocol stack components. In a preferred aspect of the invention, the listing can be a reverse listing having a reverse ordered list of the dependent ones of the server-side protocol stack components in the server-side protocol stack based upon the mapping. Also, it is preferred that the publishable interface be a native directory interface to at least one object incorporating the listing.

In a method for configuring a client-side communications protocol stack, a mapping can be consulted to determine a set of client-side protocol stack components which correspond to a set of protocol stack components in a server side protocol stack instance. Subsequently, a listing can be created of the determined set of client-side protocol stack components. Finally, the listing can be published for access by externally disposed client computing processes. Preferably, the listing can be reversed. Also, the consulting step further can include determining at least one attribute to be applied to at least one of the client-side protocol stack components when enabling a client-side protocol stack to interoperate with the server-side protocol stack instance.

Conversely, a method for configuring a client-side communications protocol stack can include accessing a listing of required client-side protocol stack components which correspond to protocol stack components aggregated in a server-side protocol stack instance. It can be determined from the listing whether a client-side protocol stack instance already exists which includes the required client-side protocol stack components. If the client-side protocol stack instance already exists, the client-side protocol stack instance can be re-used to communicate with the server-side protocol stack. Otherwise a new instance of a client-side protocol stack can be created using the required client-side protocol stack components.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

The present invention is a method, system and apparatus for intelligently configuring a client computing process for communication with a server computing process based upon a dynamically selected and configured communications protocol stack. In accordance with the present invention, different corresponding protocol elements or components in a protocol stack can be mapped as between the server computing process and one or more client computing processes configured to access the server computing process. For server side protocol components having specifically defined attributes which map to attributes in a prospective client side protocol component, those attributes can be specified in the mapping as well. The mapping along with the specified attributes can be stored for subsequent use when deploying a protocol stack in the server.

When a protocol stack is to be deployed for use in the server computing process, a list of dependent protocol components for the protocol stack can be generated and the list can be reversed in terms of order. For each of the protocol components in the list of dependent protocol components, the values of any properties can be retrieved. Consequently, a client configuration for the protocol stack can be created using both the reversed list of dependent protocol components and the retrieved values of any properties for the property dependencies of the protocol stack. Subsequently, the configuration can be published so that client processes attempting to communicate with the server can discover the stored configuration.

When a client computing process attempts to communicate with the server computing process, the client computing process first can query the server specified protocol configuration through its prior publication. Once discovered, the client process can determine whether the specified protocol configuration already exists in the client process. If so, the protocol configuration can be re-used to communicate with the server process. Otherwise, the specified configuration can be created in the server and configured with the associated property values for the dependencies of the configuration. When the protocol stack becomes operable, the client process can use the protocol stack to communicate with the server process.

Figure 1:
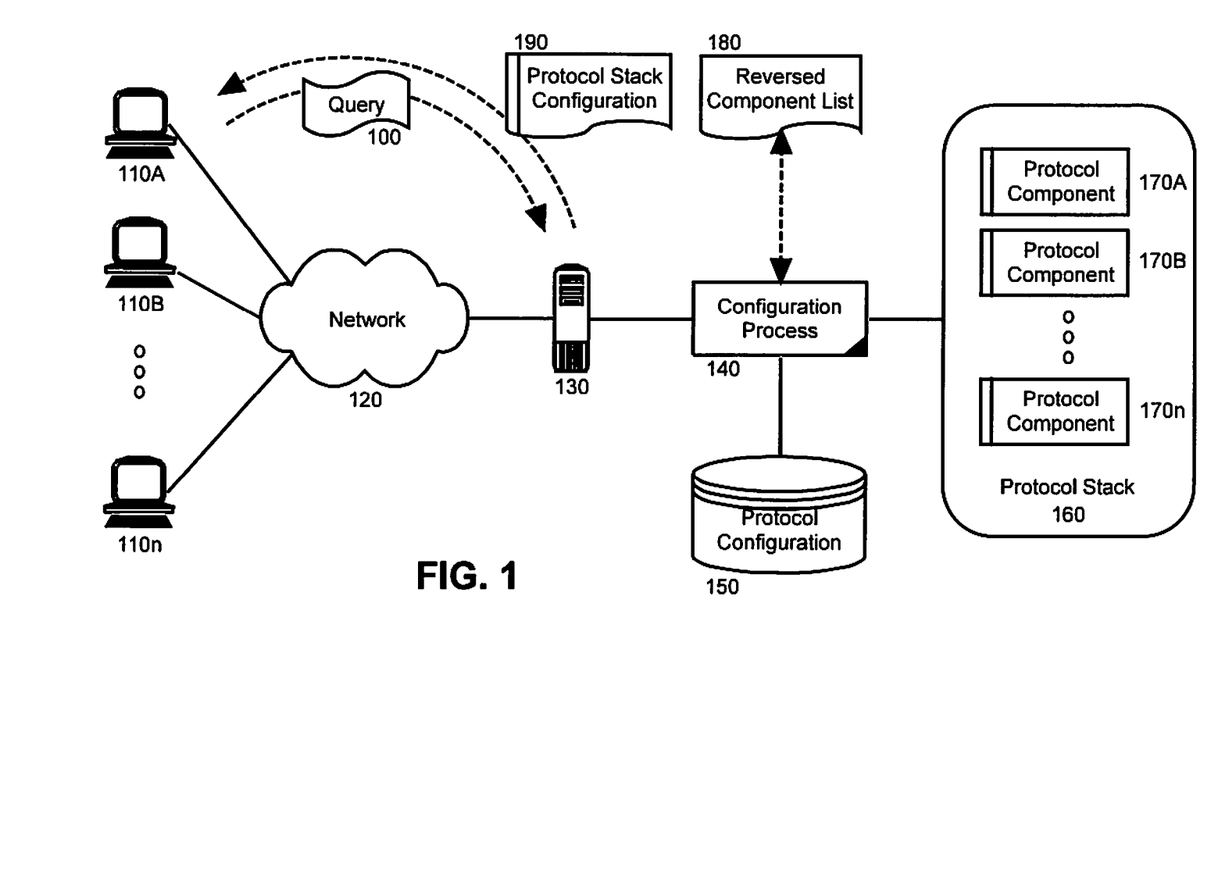
FIG. 1 is a schematic illustration of a computing system configured for the server-side configuration of accessing clients in accordance with the inventive arrangements.

In more particular illustration of the foregoing invention, FIG. 1 is a schematic illustration of an exemplary albeit non-exclusive computing system configured for the server-side configuration of accessing client processes in accordance with the inventive arrangements. The system can include one or more client computing process 110A, 110B, 100n programmed for communicative coupling to a server process 130 over a computer communications network 120. Notably, each client computing process 110A, 110B, 110n can communicate with the server computing process 130 using an established communications protocol. The established communications protocol can include not only a physical and applications protocol, for example HTTP using TCP/IP, but also the operation of one or more ancillary procedures such as an encryption or compression process.

The server communications process 130 can be coupled to a configuration processor 140. The configuration processor 140 can establish a set of protocol configurations 150. Specifically, the configuration processor 140 can map individual components required for the operation of the protocol in the server computing process 130 with corresponding required components in any one of the client computing processes 110A, 110B, 110n. When a protocol stack is to be created in the server computing process 130, the component dependencies of the set of components in the stack can be listed and subsequently reversed to produce a reverse configuration 180. Individual property values of the components in the reverse configuration 180 further can be determined and the combination can be published as a protocol stack configuration 190. In particular, as it is well known in the art, the configuration of the protocol stack 190 can be published in the global names space as an interface to one or a set of class objects whose contents can be recognized through a native directory interface.

In operation, when one of the client computing processes 110A, 110B, 110n desires to establish a communicative link with the server computing process 130, the client computing process 110A, 110B, 110n first can forward a query 100 to the server computing process 130 requesting that the server computing process 130 identify the preferred communications protocol configuration. In response, the server computing process 130 can return access to the protocol stack configuration 190 with which the requesting one of the client computing processes 110A, 110B, 110n can select and configure the preferred communications protocol stack as defined by the protocol stack configuration 190.

The process of configuring a client computing process to communicate with the server computing process using a preferred communications protocol configuration can include linking server side and client side protocols to one another in a mapping. The process also can include starting a communications protocol stack in the server computing process and developing a corresponding publishable client side communications protocol stack configuration based upon the mapping. Finally, the process can include selecting and configuring a specific protocol stack of different client side protocol components based upon a server specified protocol stack.

Figure 2:
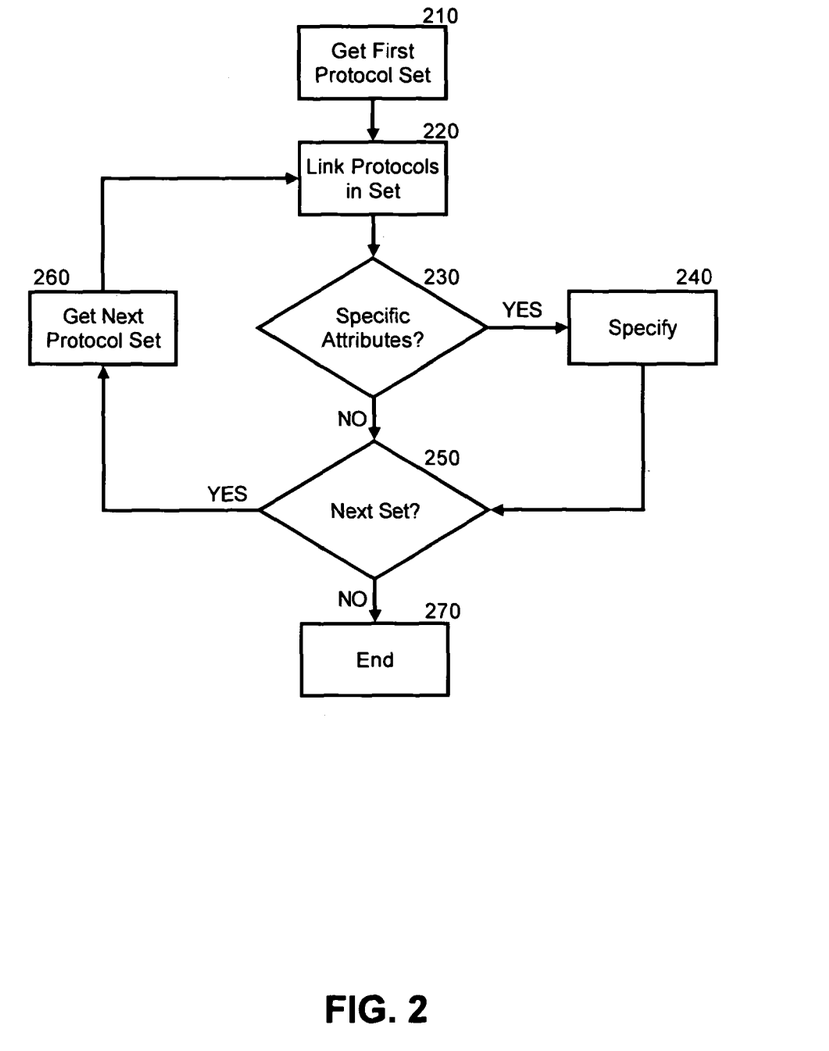
FIG. 2 is a flow chart illustrating a process for linking corresponding client and server protocol elements in a server side configuration in the system of FIG. 1.

To further illustrate the foregoing process, FIG. 2 is a flow chart illustrating a process for linking corresponding client and server protocol elements in a server side configuration in the system of FIG. 1. Beginning in block 210, a first protocol set can be loaded for configuration. In block 220, each of the protocol components in the set for the server computing process can be linked or mapped to corresponding dependent protocol components for a prospective communicating client process. For example, the use of the HTTP application level protocol in the server computing process can be mapped to HTTP in the client computing process. Likewise, TCP as a physical control layer protocol in the server computing process can be mapped to TCP in the client computing process. As yet another example, a decompression process in the server computing process can be mapped to a compression process in the client computing process.

In any event, in decision block 230, it can be determined whether specific attributes of selected ones of the dependent protocol components are to be applied based upon the application of specific attributes corresponding ones of the protocol components in the server computing process. If attributes are to be mapped, the attributes can be so specified in the mapping in block 240. In either circumstance, in decision block 250, it can be determined whether additional protocol sets remain to be processed. If so, in block 260 the set of protocols can be loaded for configuration and the process can repeat in blocks 220 through 260. When no more protocol sets remain to be configured in the mapping, the process can end in block 270.

Figure 3:
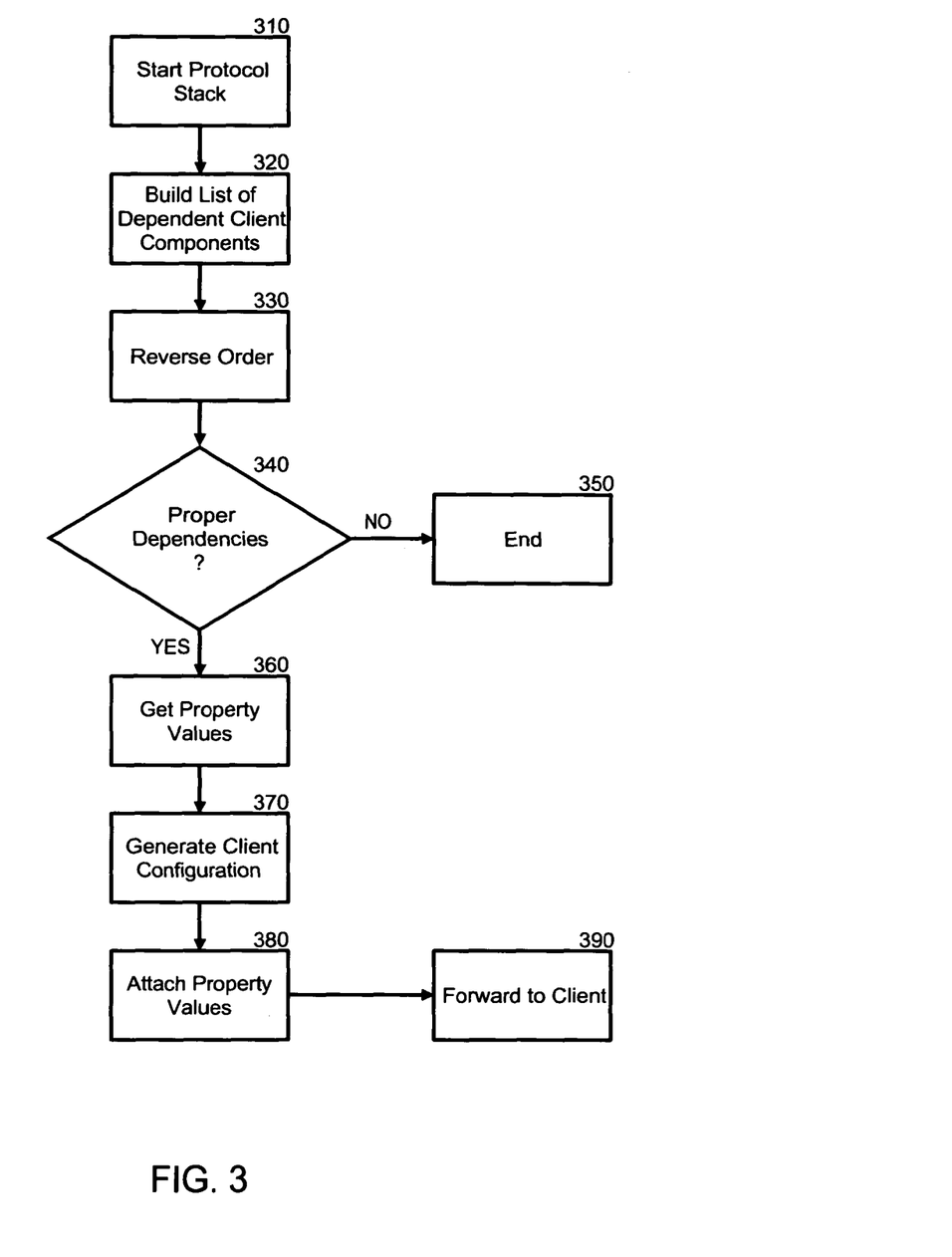
FIG. 3 is a flow chart illustrating a process for starting a protocol stack of different protocol elements in a server in the system of FIG. 1; and, FIG. 4 is a flow chart illustrating a process for selecting and configuring a specific protocol stack of different client side protocol elements based upon a server specified protocol stack in the system of FIG. 1.

Once the different protocol stack components and corresponding attributes have been linked in a mapping, a published configuration for a particular instance of a protocol stack can be produced using the mapping. More particularly, FIG. 3 is a flow chart illustrating a process for starting a protocol stack of different protocol elements in a server in the system of FIG. 1. Beginning in block 310, the protocol stack can be started. In an object-oriented environment, for example, the different protocol components aggregated into the protocol stack can be instantiated within a process address space and rendered operable therein.

In block 320, a list of client side dependent components can be created by traversing each component in the server-side protocol stack, for instance, and identifying component dependencies from the mapping. Once the list of dependent components in the protocol stack has been created, in block 330, the ordering of the list can be reversed. In this way, a client computing process building a protocol stack based upon the list can be assured that each component in the stack can rely upon its dependencies. In any case, in decision block 340, it can be determined whether the dependencies of the stack are proper in that the dependencies rely upon an available component instance. If not, the process can end in block 350. Otherwise, the process can continue through block 360.

In block 360, if proper dependencies exist, the values of the properties of each communications protocol component can be retrieved. Also, in block 370, a configuration for the protocol stack to be deployed in the client can be created based upon the reverse ordered list. Finally, in block 380, the retrieved property values can be attached to the created configuration for the client protocol stack. In block 390, on request the configuration for the client protocol stack can be passed to requesting client processes through any known mechanism. In a preferred aspect of the invention, the configuration can be published in the global namespace through a native directory interface.

Figure 4:
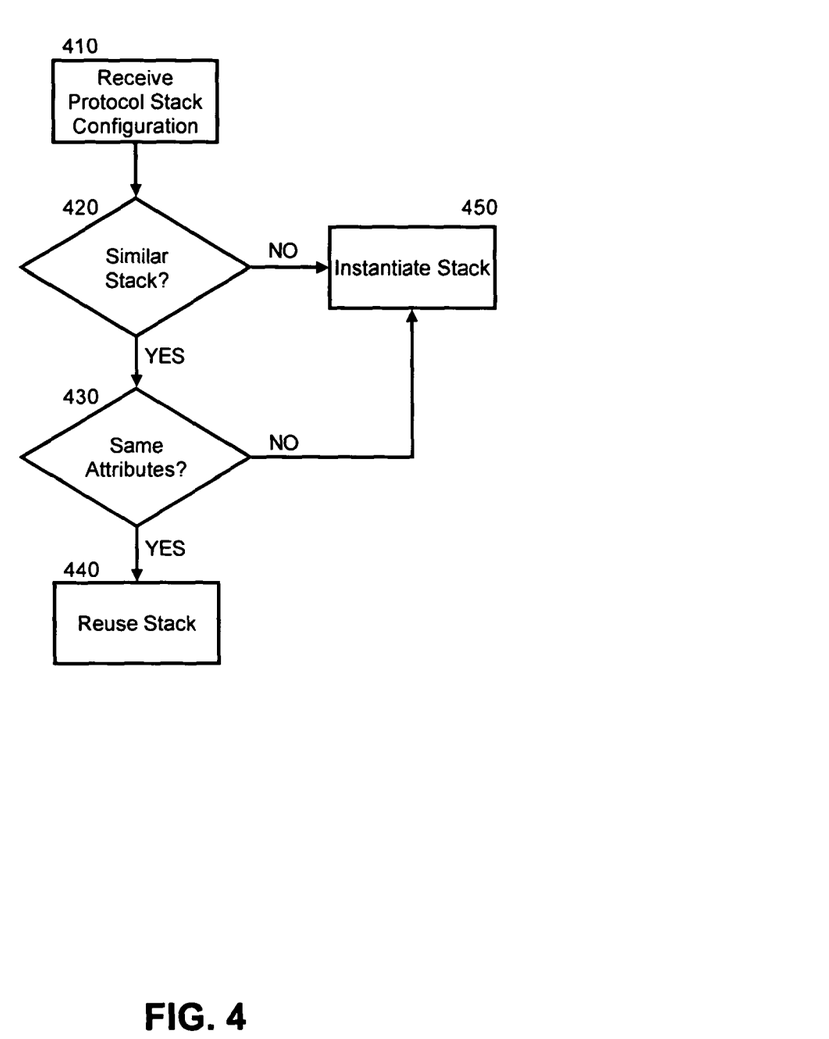

Once published the client side protocol stack configuration can be accessed by client computing processes interested in establishing a communicative link with the server computing process using a communications protocol preferred by the server computing process. Importantly, the client computing process can select a suitable communications protocol without undertaking trial-and-error in guessing which protocol to use, and without having a pre-configured understanding of which protocol to use. More specifically, FIG. 4 is a flow chart illustrating a process for selecting and configuring a specific protocol stack of different client side protocol elements based upon a server specified protocol stack in the system of FIG. 1.

Beginning in block 401, the preferred protocol stack configuration can be retrieved from the server computing process. In this regard, the client computing process can query the server computing process for the preferred protocol stack configuration, for instance by accessing the interface to the preferred protocol stack through a native directory interface to the preferred protocol stack. In decision block 420, it can be determined whether the preferred protocol stack is similar to an already existing instance of a protocol stack in the client computing process. If not, a new protocol stack instance can be created having each component specified within the configuration in proper dependency order. Additionally, the attributes of the components can be set as described in the preferred protocol stack and the property values for the properties of the components further can be set according to the preferred protocol stack.

In decision block 420, however, if the preferred protocol stack is similar to an already existing instance of a protocol stack in the client computing process, it further can be determined in block 430 whether the existing instance of the protocol stack includes the same attributes specified by the preferred protocol stack. If not, as before in block 450 a new instance of the preferred communications protocol stack can be created in the client. Otherwise, in block 440 the existing instance of the communications protocol stack can be re-used for communications with the server computing process.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods. The computer program product is embedded in one or more computer-readable storage devices having computer-readable program code or instructions embodied therein.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. An inter-process communications protocol configuration computer hardware system comprising:
   a mapping of server-side protocol stack components in a server-side protocol stack to corresponding client-side protocol stack components;

a listing of corresponding ones of said server-side protocol stack components and said client-side protocol stack components created based upon said mapping; and, a publishable interface to said listing.

2. The system of claim 1, wherein said mapping comprises:

a set of linkages between server-side protocol stack components of said server-side protocol stack and corresponding client-side protocol stack components required to exist in an associated client-side protocol stack; and, a set of attributes for selected ones of said corresponding client-side protocol stack components.

3. The system of claim 1, wherein said listing is a reverse listing comprising a reverse ordered list of said corresponding ones of said server-side protocol stack components and said client-side protocol stack component based upon said mapping.

4. The system of claim 1, wherein said publishable interface is a native directory interface to at least one object incorporating said listing.

5. A computer-implemented method for configuring a client-side communications protocol stack, the method comprising the steps of:

mapping server-side protocol stack components in a server-side protocol stack instance to corresponding client-side protocol stack components;

creating a listing of corresponding ones of said server-side protocol stack components and said client-side protocol stack components; and, publishing said listing for access by externally disposed client computing processes.

6. The method of claim 5, wherein said mapping step further comprises the step of determining at least one attribute to be applied to at least one of said client-side protocol stack components when enabling a client-side protocol stack to interoperate with said server-side protocol stack instance.

7. The method of claim 5, wherein said creating step further comprises the step of reversing an order of said created listing.

8. A computer-implemented method for configuring a client-side communications protocol stack, the method comprising the steps of:

accessing a listing of required client-side protocol stack components which correspond to server-side protocol stack components aggregated in a server-side protocol stack instance;

determining from said listing whether a client-side protocol stack instance already exists which includes said required client-side protocol stack components; and, if said client-side protocol stack instance already exists, re-using said client-side protocol stack instance to communicate with said server-side protocol stack, and otherwise creating a new instance of a client-side protocol stack using said required client-side protocol stack components.

9. The method of claim 8, wherein said accessing step comprises the step of accessing said listing through a native directory interface.

10. The method of claim 8, further comprising the steps of:

identifying attributes to be applied to said required client-side protocol stack components; and, applying said identified attributes to said client-side protocol stack components in said new instance.

11. The method of claim 10, wherein said re-using step comprises the steps of:

re-using said client-side protocol stack instance to communicate with said server-side protocol stack only if said client-side protocol stack instance includes said identified attributes; and, otherwise creating a new instance of a client-side protocol stack using said required client-side protocol stack components and including said identified attributes.

12. A non-transitory computer program product having stored thereon a computer program for configuring a client-side communications protocol stack, the computer program comprising a set of computer-readable instructions which when executed by a computer system causes the computer system to perform the steps of:

mapping server-side protocol stack components in a server-side protocol stack instance to corresponding client-side protocol stack components;

creating a listing of corresponding ones of said server-side protocol stack components and said client-side protocol stack components; and, publishing said listing for access by externally disposed client computing processes.

13. The non-transitory computer program product of claim 12, wherein said mapping step further comprises the step of determining at least one attribute to be applied to at least one of said client-side protocol stack components when enabling a client-side protocol stack to interoperate with said server-side protocol stack instance.

14. The non-transitory computer program product of claim 12, wherein said creating step further comprises the step of reversing an order of said created listing.

15. A non-transitory computer program product having stored thereon a computer program for configuring a client-side communications protocol stack, the computer program comprising a set of computer-readable instructions which when executed by a computer system cause the computer system to perform the steps of:

accessing a listing of required client-side protocol stack components which correspond to server-side protocol stack components aggregated in a server-side protocol stack instance;

determining from said listing whether a client-side protocol stack instance already exists which includes said required client-side protocol stack components; and, if said client-side protocol stack instance already exists, re-using said client-side protocol stack instance to communicate with said server-side protocol stack, and otherwise creating a new instance of a client-side protocol stack using said required client-side protocol stack components.

16. The non-transitory computer program product of claim 15, wherein said accessing step comprises the step of accessing said listing through a native directory interface.

17. The non-transitory computer program product of claim 15, further comprising the steps of:

identifying attributes to be applied to said required client-side protocol stack components; and, applying said identified attributes to said client-side protocol stack components in said new instance.

18. The non-transitory computer program product of claim 17, wherein said re-using step comprises the steps of:

re-using said client-side protocol stack instance to communicate with said server-side protocol stack only if said client-side protocol stack instance includes said identified attributes; and, otherwise creating a new instance of a client-side protocol stack using said required client-side protocol stack components and including said identified attributes.

\* \* \* \* \*